United States Patent [19]

Ogawa

[11] Patent Number: 4,917,755
[45] Date of Patent: Apr. 17, 1990

[54] BELT JOIN APPARATUS FOR TIRE BUILDING DRUMS

[75] Inventor: Yuichiro Ogawa, Kodaira, Japan

[73] Assignee: Bridgestone Corporation, Tokyo, Japan

[21] Appl. No.: 214,925

[22] Filed: Jun. 30, 1988

Related U.S. Application Data

[63] Continuation of Ser. No. 839,625, Mar. 14, 1986, abandoned.

[30] Foreign Application Priority Data

Mar. 19, 1985 [JP]   Japan ................................... 60-57385

[51] Int. Cl.⁴ ...................... B29D 30/08; B29D 30/16; B32B 31/04
[52] U.S. Cl. ................................ 156/405.1; 156/133; 156/554; 156/556
[58] Field of Search ..................... 156/405.1, 123, 133, 156/134, 395, 397, 538, 543, 554, 556, 547, 549, 550

[56] References Cited

U.S. PATENT DOCUMENTS

| | | | |
|---|---|---|---|
| 2,354,120 | 7/1944 | Haren | 156/361 |
| 4,145,237 | 3/1979 | Mercier et al. | 156/109 |
| 4,409,872 | 10/1983 | Bertoldo | 156/405.1 |

FOREIGN PATENT DOCUMENTS 59-131816   4/1984   Japan .

*Primary Examiner*—Robert A. Dawson
*Assistant Examiner*—Gregory J. Wilber
*Attorney, Agent, or Firm*—Cushman, Darby & Cushman

[57] ABSTRACT

A belt join method, which is used in forming pneumatic radial tires, for joining belt components one upon the other and an apparatus therefor, in which the belt components are centered in such a manner that the center axes thereof are substantially coincident or vertically aligned with one another, by passing through a plurality of longitudinally aligned belt adjusting rollers which are urged by means of a spring.

3 Claims, 3 Drawing Sheets

BELT JOIN APPARATUS FOR TIRE BUILDING DRUMS

This is a continuation of application Ser. No. 839,625, filed Mar. 14, 1986 which was abandoned upon the filing hereof.

FIELD OF THE INVENTION

The present invention relates in general to a belt join method and an apparatus therefor, and in particular to a method and an apparatus therefor, which are adapted to be used in forming pneumatic radial tires, for joining the belt components one upon the other so that the center axes thereof are substantially coincident or vertically aligned with one another.

SUMMARY OF THE INVENTION

In accordance with one important aspect of the present invention, there is provided a belt join method for tire building drums, comprising the steps of conveying a first belt component in a predetermined direction and a second belt component in the direction at a predetermined angle with respect to the first belt component; centering the first and second belt components so that center axes of the first and second belt components are vertically aligned with each other; and pressing and joining one upon the other the first and second belt components which are centered.

In accordance with another important aspect of the present invention, there is provided a belt join apparatus for tire building drums comprising a first belt conveyor assembly for conveying a first belt component; a second belt conveyor assembly for conveying a second belt component, the second belt conveyor assembly being arranged at a predetermined angle with respect to the first belt conveyor assembly; centering means comprising an upper centering assembly arranged above the second belt conveyor assembly for centering the second belt component, a lower centering assembly arranged below the first belt conveyor assembly for centering the first belt component, an upper drive assembly for driving the upper centering assembly, and a lower drive assembly for driving the lower centering assembly; and press means for pressing and joining one upon the other the first and second belt components centered by the first and second centering assemblies.

BRIEF DESCRIPTION OF THE DRAWINGS

The drawbacks of a prior art belt feed method and an apparatus therefor for feeding belt components to a tire building drum and the features and advantages of a belt join method and an apparatus therefor according to the present invention will be more clearly understood from a consideration of the following detailed description in conjunction with the annexed drawings in which like reference numerals designate corresponding or similar members and structures and in which.

DESCRIPTION OF THE PRIOR ART

Figure 3:
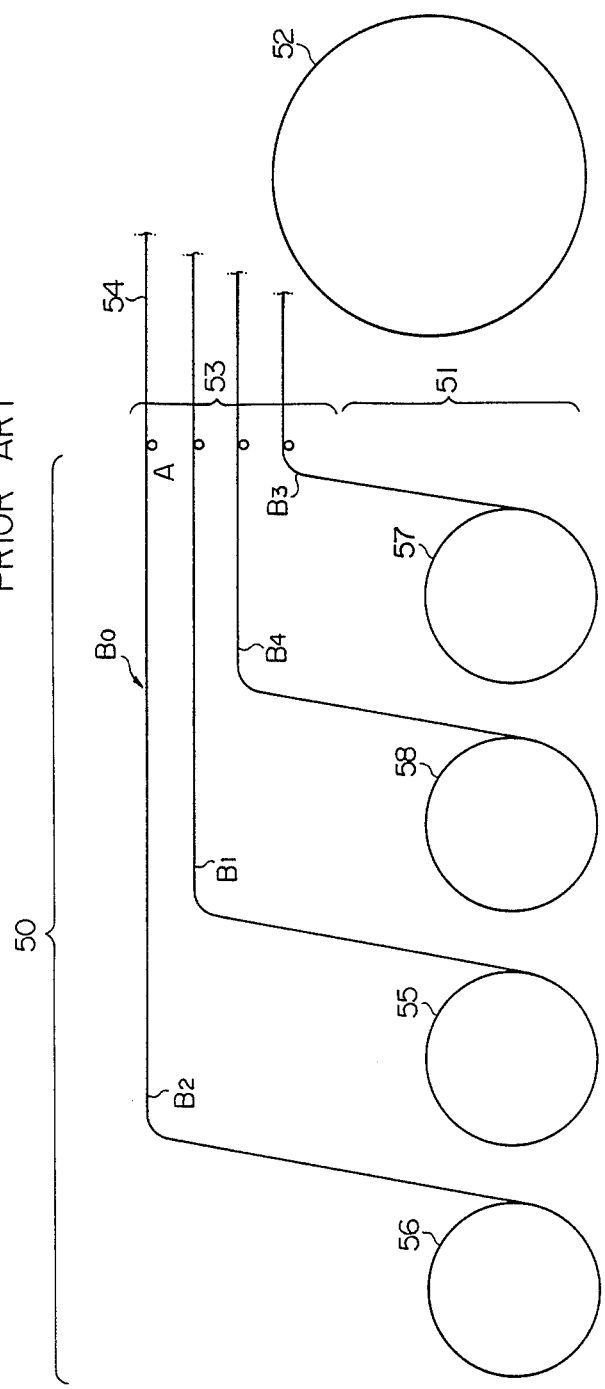
FIG. 3 is a side view, generally schematic in form, showing supply rollers for supplying belt components and a tire building drum, on which the belt components are applied to form a belt, which are employed in the prior art belt feed method and the prior art apparatus therefor.

Referring now to FIG. 3 of the annexed drawings, there is shown a prior art belt feed method for feeding belt components to the tire building drum of a tire building machine and a prior art apparatus therefor. In FIG. 3, reference numeral 50 designates a representative conventional belt feed machine which consists of a belt unwinding apparatus 51 for unwinding belt components indicated at $B_o$ and a belt feed apparatus 53 for feeding the belt components $B_o$ unwound from the belt unwinding apparatus 51 to a tire building drum 52, which is arranged so that the longitudinal center axis or axial direction thereof is substantially perpendicular to the feed direction in which the belt components $B_o$ are transferred. The belt components $B_o$ fed from the belt feed apparatus 53 is directed through a suitable guide assembly 54 to the tire building drum 52. In forming a belt to be used in pneumatic radial tires for buses and trucks, four belt components (which are designated by a second belt component $B_2$, a first belt component $B_1$, a fourth belt component $B_4$ and a third belt component $B_3$, respectively, in the order viewed from the radially outside of the belt) are normally employed. These belt components $B_2$, $B_1$, $B_4$ and $B_3$ are each composed of a plurality of rubberized steel cords which are spaced apart in substantially parallel relation to one another. In pneumatic radial tires for buses and trucks, the steel cords of the outer first belt component $B_1$ of large width extend leftwardly and upwardly at a large angle with respect to the axial direction of the tire building drum 52, and the steel cords of the second belt component $B_2$ of small width similarly extend leftwardly and upwardly at a large angle substantially equal to the large angle of the first belt component $B_1$. Also, the steel cords of the inner third belt component $B_3$ extend rightwardly and upwardly at a small angle with respect to the axial direction of the tire building drum 52, while the steel cords of the inner fourth belt component $B_4$ extend rightwardly and upwardly at a large angle.

The first, second, third and fourth belt components $B_1$, $B_2$, $B_3$ and $B_4$ are unwound from first, second, third and fourth supply rollers 55, 56, 57 and 58, respectively, and are transferred through the guide assembly 54 to the tire building drum 52. Thereafter, the third, fourth, first and second belt components $B_3$, $B_4$, $B_1$ and $B_2$ are respectively applied in this order on the tire building drum 52 and are respectively cut to predetermined lengths by a suitable heated cutter. These application and cut operations are thus repeated four times corresponding to the number of the belt components.

Such a conventional belt feed method has however the drawback that the repetitive application and cut operations causes the operator's fatigue and variation in quality of the finished belts. Further, by reason that the belt components are respectively applied and respectively cut, the period of the application of the belt components on the tire building drum is considerably increased, so that the rate of operation of the tire building drum and the efficiency of the application are considerably decreased. Furthermore, the variation in quality of the finished belt results in deterioration in the quality of the finished belt.

Accordingly, it is an important object of the present invention to provide in the belt feed machine as hereinbefore described an improved belt join method and an apparatus therefor wherein the period of the application of the belt components on the tire building drum are considerably shortened, the rate of operation of the tire building drum and the efficiency of the application are considerably improved, and the variation in quality of the finished belts are reduced, thereby enhancing the quality of the finished belt. The object of the present invention is achieved by centering the belt components one upon the other so that the center axes thereof are substantially coincident or vertically aligned with one another.

DESCRIPTION OF THE PREFERRED EMBODIMENT

Figure 1:
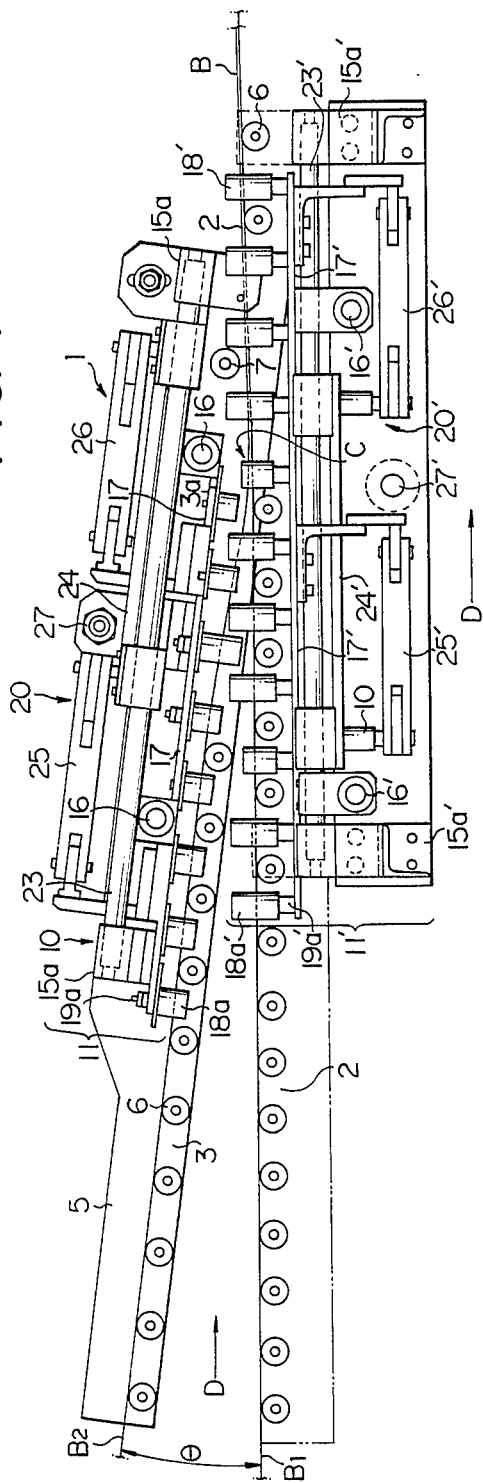
FIG. 1 is a side elevational view of a belt join apparatus, constructed in accordance with the present invention, for joining the belt components one upon the other so that the center axes thereof are substantially coincident or vertically aligned with one another, in which a belt join method according to the present invention is carried out.
Figure 2:
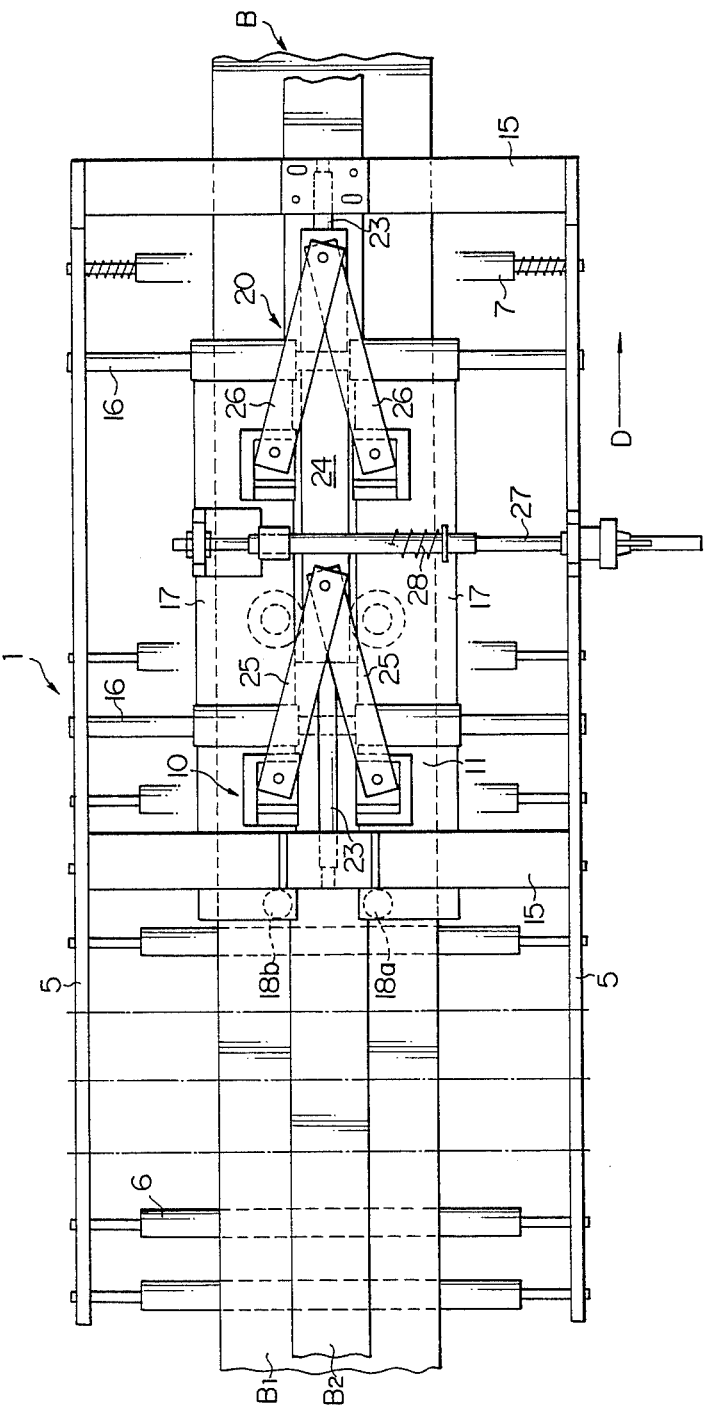
FIG. 2 is a part-plan view of the belt join apparatus shown in FIG. 1.

FIGS. 1 and 2 of the drawings show a belt join apparatus according to the present invention for joining belt components one upon the other so that the respective center axes thereof are substantially coincident or vertically aligned with one another, in which a belt join method according to the present invention is carried out.

Referring now to FIGS. 1 and 2, the belt join apparatus, constructed in accordance with the present invention, is generally designated by reference numeral 1. The belt join apparatus 1 is mounted on the prior art belt feed apparatus 53 of the belt feed machine 50, for example, on the place indicated at A in FIG. 3. The belt join apparatus 1 comprises a first belt conveyor assembly indicated at 2 for conveying a first belt component $B_1$ and a second belt conveyor assembly indicated at 3 for conveying a second belt component $B_2$. The first and second belt components $B_1$ and $B_2$ are substantially similar in direction and angle of the cords. The second belt conveyor assembly 3 is arranged at a predetermined angle indicated at $\theta$ with respect to the first belt conveyor assembly 2 and has at its front end portion a belt joining end 3a for joining the first and second belt components $B_1$ and $B_2$ at a junction indicated at C on the first belt conveyor assembly 2. The first and second belt conveyor assemblies 2 and 3 are similarly constructed and each have a plurality of spaced guide rollers 6 each extending in the direction substantially perpendicular to a feed direction, indicated by arrow D, in which the first and second belt components $B_1$ and $B_2$ are transferred toward the tire building drum of a tire building machine (not shown). The guide rollers 6 are each rotatably supported at opposite ends thereof by spaced side frames 5 and 5 which extend in the feed direction of the first and second belt components $B_1$ and $B_2$. Pressing means such as a press roller, indicated at 7, extending in the direction substantially perpendicular to the feed direction is rotatably supported by the front end portions of the side frames 5 and 5 to press and join together the first and second belt components $B_1$ and $B_2$ which are passed through the junction C and are vertically aligned with each other in a manner to be hereinafter described.

Centering means designated generally by reference numeral 10 comprises an upper centering assembly 11 arranged above the second belt conveyor assembly 3 for centering the second belt component $B_2$, a lower centering assembly 11' arranged below the first belt conveyor assembly 2 for centering the first belt component $B_1$, an upper drive assembly 20 for driving the upper centering assembly 11, and a lower drive assembly 20' for driving the lower centering assembly 11'. The upper and lower centering assemblies 11 and 11' are substantially similar in construction and operation and therefore the parts of the lower centering assembly 11' are designated by prime "'" for avoiding the description therefor. Only different parts of the lower centering assembly 11' will be described.

The centering means 10 will be hereinafter described in detail.

The upper centering assembly 11 comprises a pair of transverse frames 15 and 15 which are spaced apart a predetermined distance in the feed direction of the first and second belt components $B_1$ and $B_2$ and which are connected at opposite ends thereof to the side frames 5 and 5. Likewise, a pair of spaced transverse frames 15' and 15' are provided in the lower centering assembly 11'. A pair of spaced guide bars 16 and 16 extending in the directions substantially perpendicular to the feed direction are connected to the spaced side frames 5 and 5, respectively. Likewise, a pair of spaced guide bars 16' and 16' are provided in the lower centering assembly 11'. A pair of belt adjusting members or plates 17 and 17 extending in the feed direction of the first and second belt components $B_1$ and $B_2$ are slidably mounted through brackets on the guide bars 16 and 16, respectively, so as to be movable on and along the guide bars 16 and 16. Similarly, in the lower centering assembly 11' are provided a pair of belt adjusting plates 17' and 17' movable on and along the guide bars 16' and 16'. One of the belt adjusting plates 17 and 17 has rotatably supported thereon a first series of belt adjusting rollers 18a through a plurality of shafts 19a, respectively, to adjust and center the first and second belt components $B_1$ and $B_2$. The first series of belt adjusting rollers 18a is arranged in a row in the feed direction of the first and second belt component $B_1$ and $B_2$ and projects from the lower surface of the one of the belt adjusting plates 17 and 17 toward the first and second belt component $B_1$ and $B_2$. Likewise, a second series of belt adjusting rollers 18b projects from the lower surface of the other of the belt adjusting plates 17 and 17 toward the first and second belt component $B_1$ and $B_2$ and is supported for rotation by a plurality of shafts 19b (not shown), respectively, which in turn are supported by the other of the belt adjusting plates 17 and 17 and which are arranged in a row in the feed direction of the first and second belt component $B_1$ and $B_2$. First and second series of belt adjusting rollers 18a' and 18b' supported rotatably by the shafts 19a' and 19b' are also provided in the lower centering assembly 11'. The belt adjusting rollers 18a of the upper centering assembly 11 and belt adjusting rollers 18a' of the lower centering assembly 11' are varied in length so that they are not contacted with each other in the vicinity of the junction C. The other side belt adjusting rollers 18b and 18b' are also varied in length not so as to contact each other. The belt adjusting plates 17 and 17, 17' and 17' are concurrently driven to move toward and away from each other on and along the guide bars 16 and 16 in the direction substantially perpendicular to the feed direction of the belt components by means of the upper and lower drive assembly 20 and 20', respectively, in a manner to be hereinafter described.

The above described drive assemblies 20 and 20', belt adjusting rollers 18a, 18b and 18a' and 18b', belt adjusting plates 17 and 17', guide bars 16 and 16', and side frames 15 and 15' constitute the upper and lower centering assemblies 11 and 11', respectively, of the centering means 10.

The upper and lower drive assemblies 20 and 20' will be hereinafter described in detail.

The upper drive assembly 20 mounted on the upper belt conveyor assembly 11 comprises a guide shaft 23 which is secured at its opposite ends to the laterally intermediate portions of the transverse frames 15 and 15 and which extends substantially in the feed direction of the first and second belt components $B_1$ and $B_2$ between the transverse frames 15a and 15a', a longitudinally elongated first link member 24 slidably mounted on the guide shaft 23. Thus, the elongated first link member 24 is movable on and along the guide shaft 23 in the feed direction of the first and second belt components $B_1$ and $B_2$. The guide shaft 23 also extends parallel with the belt adjusting rollers 18a and 18b supported in a row along the belt adjusting plates 17 and 17. More particularly, the longitudinally elongated guide shaft 23 is situated midway between the longitudinally aligned belt adjusting rollers 18a and the other side belt adjusting rollers 18b. The upper drive assembly 20 further comprises a pair of second link members 25 and 25 which are pivotably connected at one ends thereof to the rear end portion of the first link member 24 and at the other ends thereof to the rear end portions of the belt adjusting plates 17 and 17, a pair of third link members 26 and 26 which are pivotably connected at one ends thereof to the front end portion of the first link member 24 and at the other ends thereof to the front end portions of the belt adjusting plates 17 and 17, and a screw rod 27 which is connected at its one end to one of the belt adjusting plates 17 and 17 through a spring 28 secured as shown in FIG. 2 and at the other end thereof in threaded relation to one of the side frame 5. Thus, the belt adjusting plates 17 and 17 are driven to concurrently move toward and away from each other on and along the guide bars 16 and 16 in the directions substantially perpendicular to the feed direction of the first and second belt components $B_1$ and $B_2$, through the first, second and third link members 24, 25 and 26 by the revolution of the screw rod 27. In a similar way, the lower drive assembly 20' mounted on the lower belt conveyor assembly 11' comprises, a shaft 23', a first link member 24', a pair of second link members 25' and 25', a pair of third link member 26' and 26', and a screw rod 27'.

The operation of the belt join apparatus constructed in accordance with the present invention will be hereinafter described in detail.

The belt components vary in width with the constructions and sizes of tires. Thus, the upper and lower centering assemblies 11 and 11' of the belt join apparatus 1 according to the present invention are adjusted in accordance with the widths of the second and first belt components $B_2$ and $B_1$, respectively.

One of the belt adjusting plates 17 and 17 of the upper centering assembly 11 is driven to move away from or toward the longitudinally elongated guide shaft 23 along the laterally elongated guide bars 16 and 16 by the revolution of the screw rod 27. As a consequence, the other belt adjusting plate 17 is driven at the same time to move away from or toward the guide shaft 23 along the guide bars 16 and 16 by the link mechanism consisting of the first, second and third link members 24, 25 and 26. As a result of lateral movements of the belt adjusting plates 17 and 17, the belt adjusting rollers 18a and 18b respectively aligned along the opposite belt adjusting plates 17 and 17 are spaced apart a predetermined width which corresponds to the width of the second belt component $B_2$ and the center axis of which is substantially coincident or vertically aligned with the center axis of the guide shaft 23. Similarly, the belt adjusting plates 17' and 17' of the lower centering assembly 11' are driven by the revolution of the screw rod 27' so that the belt adjusting rollers 18a' and 18b' are spaced apart a predetermined width which corresponds to the width of the first belt component $B_1$ and the center axis of which is substantially coincident or vertically aligned with the center axis of the guide shaft 23. In this way, a pair of the upper and lower centering assemblies 11 and 11' are adjusted so that they have the same center axis and respective predetermined widths corresponding to the widths of the first and second belt components $B_1$ and $B_2$.

In joining the belt components one upon the other, the first and second belt components $B_1$ and $B_2$, the cords of which are substantially equal in cord direction and cord angle in relation to one another, are first unwound from the first and second supply rollers 55 and 56 as shown in FIG. 3, respectively. The unwound first and second belt components $B_1$ and $B_2$ are transferred to the belt join apparatus according to the present invention. Then, the first belt component $B_1$ is conveyed on the first belt conveyor assembly 2 toward the tire building drum, and the second belt component $B_2$ is conveyed on the second belt conveyor assembly 3 toward the tire building drum. Thereafter, the side portions of the second belt components $B_2$ are held against the belt adjusting rollers 18a and 18b supported on the belt adjusting plates 17 and 17, respectively, of the upper centering assembly 11 of the centering means 10. The side portions of the first belt component $B_1$ are also held against the belt adjusting rollers 18a' and 18b' supported on the belt adjusting plates 17' and 17', respectively, of the lower centering assembly 11' of the centering means 10. For this reason, while passing through the belt adjusting rollers 18a and 18b of the upper centering assembly 11, the second belt component $B_2$ is centered by the contraction force of the spring 28 exerted upon the belt adjusting rollers 18a and 18b so that the center axis of the second belt component $B_2$ is vertically aligned with the center axis of the guide shaft 23. In a similar way, while passing through the belt adjusting rollers 18a' and 18b' of the lower centering assembly 11', the first belt component $B_1$ is centered by the contraction force of the spring 28' exerted upon the belt adjusting rollers 18a' and 18b' so that the center axis of the first belt component $B_1$ is vertically aligned with the center axis of the guide shaft 23' At the junction C, the second and first belt components $B_2$ and $B_1$ are overlapped with each other, and are then formed into a join belt indicated at B after being pressed and joined together by the press roller 7.

This join belt B is passed through the guide assembly 54 as shown in FIG. 3 and is applied, with the other belt components $B_3$ and $B_4$, on the tire building drum 52. In this instance, the belt component $B_3$ is first applied on the tire building drum 52 and is then cut to a predetermined length by the operator with the heated cutter. Thereafter, the belt component $B_4$ is similarly applied on the belt component $B_3$ previously applied on the tire building drum 52. The join belt B composed of the belt components $B_2$ and $B_1$ is then applied on the belt components $B_4$ and $B_3$ applied on the tire building drum 52 and is readily cut in the cord direction with the heated cutter and is finally formed into a finished belt (not shown) of four plies, the center axes of which are vertically aligned with one another. Accordingly, since the first belt components $B_1$ and $B_2$ are applied at the same time and are cut at the same time, the period of the application of the belt components on the tire building drum is considerably shortened, so that the rate of operation of the tire building drum and the efficiency of the application are considerably improved. In addition, since center axes of the belt components of the finished belt are vertically aligned with one another, the variation in quality of the finished belt is reduced, thereby enhancing the quality of the finished belt.

From the foregoing, it will been seen that, in accordance with the present invention, there is provided an improved belt feed method and an apparatus therefor wherein the period of the application of the belt components on the tire building drum are considerably shortened, the rate of operation of the tire building drum and the efficiency of the application are considerably improved, and the variation in quality of the finished belts are reduced, thereby enhancing the quality of the finished belt.

While a certain representative embodiment and details have been shown for the purpose of illustrating the present invention, it will be apparent to those skilled in this art that various changes and modifications may be made therein without departing from the spirit or scope of the invention.

What is claimed is:

1. A belt join apparatus for tire building drums comprising:
    a first belt conveyor assembly for conveying a first belt component having a plurality of steel cords;
    a second belt conveyor assembly for conveying a second belt component having a plurality of steel cords, the second belt conveyor assembly being arranged at a predetermined angle with respect to said first belt conveyor assembly, the first and second belt components being conveyed so that the steel cords of said first and second belt components become substantially equal in cord direction and cord angle in relation to one another;
    centering means comprising an upper centering assembly arranged above said second belt conveyor assembly for centering said second belt component, a lower centering assembly arranged below said first belt conveyor assembly for centering said first belt component, an upper drive assembly for driving said upper centering assembly, and a lower drive assembly for driving said lower centering assembly;
    press means for pressing and joining one upon the other of said first and second belt components with said steel cords of said first and second belt components disposed in the same cord direction and same cord angle and with said first and second belt components centered by said upper and lower centering assemblies;
    feeding means for feeding the joined belt components, wherein the steel cords of said first and second belt components are equal in cord direction and cord angle in relation to one another, as a unit to a tire building drum; and
    cutting means for cutting the joined first and second belt components whereby the joined belt components can be applied simultaneously in one step to a tire building drum and then cut simultaneously to a predetermined length along the same cord directions of said first and second belt components.

2. A belt join apparatus for tire building drums comprising:
    a first belt conveyor assembly for conveying a first belt component having a plurality of cords;
    a second belt conveyor assembly for conveying a second belt component having a plurality of cords, the second belt conveyor assembly being arranged at a predetermined angle with respect to said first belt conveyor assembly, the cords of said first and second belt components being substantially equal in cord direction and cord angle in relation to one another;
    centering means comprising an upper centering assembly arranged above said second belt conveyor assembly for centering said second belt component, a lower centering assembly arranged below said first belt conveyor assembly for centering said first belt component, an upper drive assembly for driving said upper centering assembly, and a lower drive assembly for driving said lower centering assembly;
    each of said upper and lower centering assemblies comprising a pair of spaced guide bars extending in directions substantially perpendicular to a feed direction of said first and second belt components, a pair of belt adjusting members slidably mounted on said guide bars, respectively, and a plurality of guide rollers rotatably supported by said respective belt adjusting members, the guide rollers being arranged in a row on said respective belt adjusting members in said feed direction of said first and second belt components and projecting from said respective belt adjusting members toward said first and second belt components;
    press means for pressing and joining one upon the other of said first and second belt components centered by said upper and lower centering assemblies; and
    cutting means for cutting the joined first and second belt components whereby the joined belt components can be applied simultaneously in one step to a tire building drum and then cut simultaneously to a predetermined length.

3. A belt join apparatus for tire building drums comprising:
    a first belt conveyor assembly for conveying a first belt component having a plurality of cords;
    a second belt conveyor assembly for conveying a second belt component having a plurality of cords, the second belt conveyor assembly being arranged at a predetermined angle with respect to said first belt conveyor assembly, the cords of said first and second belt components become substantially equal in cord direction and cord angle in relation to one another;
    centering means comprising an upper centering assembly arranged above said second belt conveyor assembly for centering said second belt component, a lower centering assembly arranged below said first belt conveyor assembly for centering said first belt component, an upper drive assembly for driving said upper centering assembly, and a lower drive assembly for driving said lower centering assembly;

each of said upper and lower drive assemblies comprising a pair of frames extending in directions substantially perpendicular to a feed direction of said first and second belt components, a guide shaft mounted on said frames and extending substantially in said feed direction, a first link member slidably mounted on said guide shaft, a pair of second link members which are pivotably connected at one ends thereof to said first link member and at the other ends thereof to said belt adjusting members, a pair of third link members which are pivotally connected at one ends thereof to said first link member and at the other ends thereof to said belt adjusting members, and a screw rod which is connected at one end thereof to one of said belt adjusting members through a spring and at the other end thereof in threaded relation to one of said frames;

press means for pressing and joining one upon the other of said first and second belt components centered by said upper and lower centering assemblies; and cutting means for cutting the joined first and second belt components whereby the joined belt components can be applied simultaneously in one step to a tire building drum and then cut simultaneously to a predetermined length.

* * * * *